Patented Oct. 16, 1951

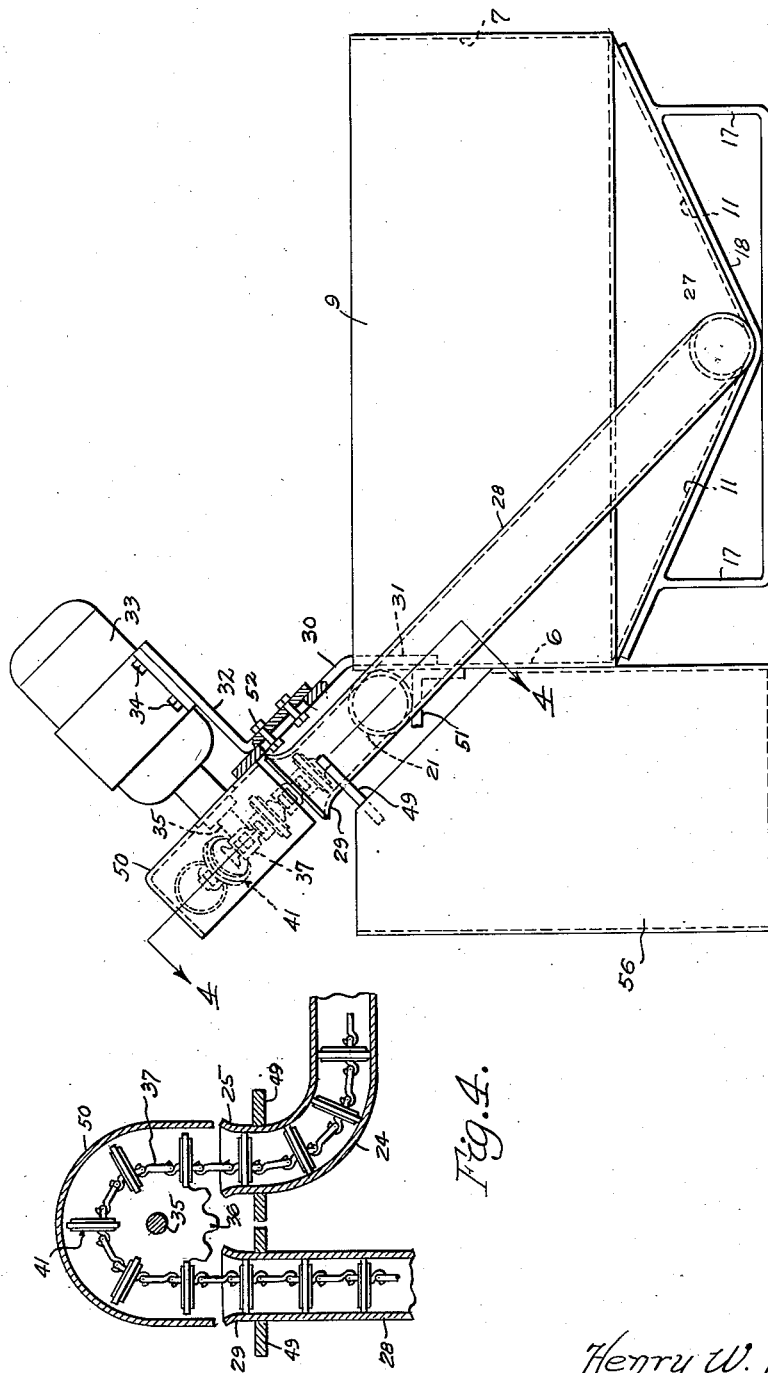

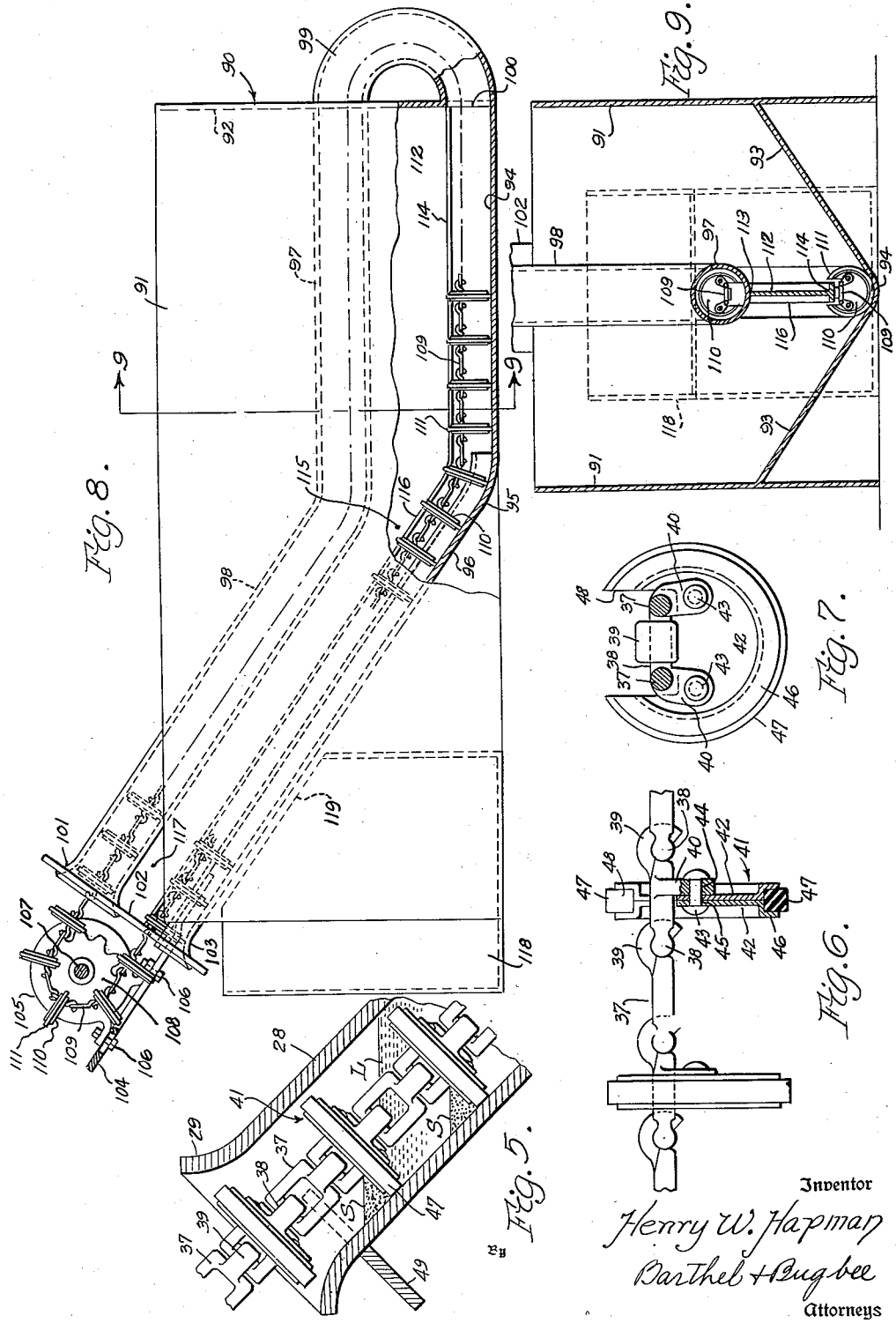

2,571,444

UNITED STATES PATENT OFFICE 2,571,444

FLIGHT CONVEYER

Henry W. Hapman, Detroit, Mich., assignor of forty per cent to Hannah Jane Hapman, Detroit, Mich.

Original application October 12, 1944, Serial No. 558,424. Divided and this application November 12, 1947, Serial No. 785,268

2 Claims. (Cl. 198—168)

This invention relates to conveyors and in particular to flight conveyors.

One object of this invention is to provide an endless flight conveyor which is constructed with flight members of a suitable shape to conform to the shape of the conduit employed, the flight members having a flexible rubber or fibre packing adapted to be attached to the conveyor chain so as to engage the walls of the conduit and remove sludge therefrom without becoming unduly worn or disintegrated through excessive use.

Another object of this invention is to provide an endless flight conveyor which is composed of a chain having interconnected links and flights secured to the chain at locations away from the centers of the flights so that the chain passes through each flight at a location considerably nearer one edge than the opposite edge, this arrangement facilitating the turning of the conveyor chain while it is moving around bends in the conduit in which it is placed and also facilitates the conveying of relatively incompressible materials such as metal chips and other sludge carried along with the current liquid from machine tools.

Another object is to provide a flight conveyor chain having pivotally interconnected links with lugs extending laterally therefrom, flights being attached to these lugs such that the chain passes through the flight away from the center thereof, the flight being at least partially of resilient or elastic deformable material such as rubber or synthetic rubber.

Another object is to provide a flight conveyor which is adapted to operate in the V-bottom of a sludge tank or other material receptacle, the conveyor including a pipe having forward and return portions arranged substantially in a vertical plane, the return portion traversing the lower portion of the tank and being cut away to receive sediment settling in the tank.

This is a division of my co-pending application, Serial No. 558,424, filed October 12, 1944, and now Patent No. 2,559,614, granted July 10, 1951, for Apparatus for Conditioning, Cleaning and Circulating Cooling Liquid.

In the drawings:

Figure 3 is an end elevation of the sludge tank of Figures 1 and 2 showing the conveyor for removing sediment therefrom;

Figure 4 is an oblique section taken along the inclined plane 4—4 in Figure 3 showing the manner in which the sludge removal conveyor is adapted to be driven by a single sprocket;

Figure 5 is a vertical section through the upper end of one of the conveyor conduits shown in Figures 3 and 4 illustrating the manner in which the sludge and other foreign matter is removed from the tank by the endless conveyor;

Figure 6 is a side elevation of a portion of the flight conveyor employed in the sludge tank shown in the various figures with a portion of one of the flights broken away to illustrate the structural details thereof;

Figure 7 is a transverse cross-sectional view through the conveyor shown in Figure 6 showing the manner in which the flights are cut away to facilitate the passage of the flights and chain over the drive sprocket;

Figure 8 is a side elevation, partly in section, of a modified form of the invention wherein the conveyor and its conduit lie approximately in a vertical plane; and Figure 9 is a vertical cross-sectional view taken on the line 9—9 in Figure 8 and illustrating the manner in which the sludge removal conveyor is guided throughout its circuitous path.

Figure 1:
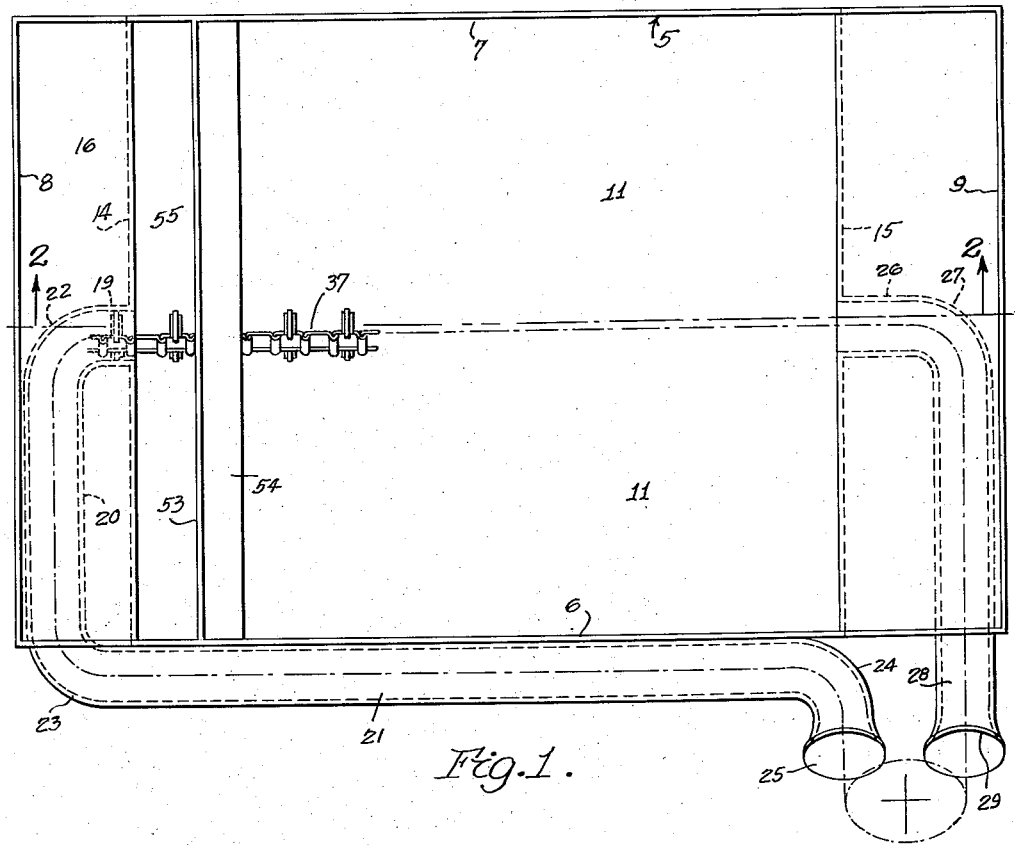
Figure 1 is a top plan view of a preferred embodiment of the invention omitting the filtering elements but showing the general assembly of the sludge tank and conveyor thereof.

Referring to the drawings in detail, Figures 1 to 7 inclusive show a preferred form of the invention as including a sludge tank, generally designated 5, having side walls 6 and 7 connected by end walls 8 and 9. A bottom wall 10 connects the side and end walls 6, 7, 8 and 9 and said bottom wall is formed with a dropped bottom portion having sloping wall portions 11. The sloping wall portions 11 converge as at 13 in a trough-shaped bottom and vertical trough walls 14 and 15 are provided at each end thereof for connection with the partial bottom wall 10. The portion of the bottom wall as at 16 is inclined to facilitate the guiding and feeding of material to the coolant tank when the same is discharged from the machine tool in which it is used.

Mounted adjacent each end of the coolant tank 5 is a bracket foot member 17 having a V-shaped cradle portion 18 for receiving the trough-shaped bottom so as to securely support the same upon a suitable floor or other supporting surface.

Secured to the end wall 14 of the dropped bottom is a conveyor conduit 19 having an inclined portion 20 and a horizontally disposed portion 21 connected by suitable elbow portions 22 and 23. The end of the horizontal tubular conduit 21 is formed with an elbow portion 24 and terminates in an outwardly flared bell-mouth portion 25 (Figure 1). Similarly, a conveyor conduit 26 is secured to the dropped bottom end wall 15 and said conduit is bent as at 27 to form an elbow portion and extends upwardly at an oblique angle in a portion 28. The upper free end of the portion 28 is outwardly flared as at 29 and terminates in juxtaposed relation to the outwardly flared portion 25 of the conveyor conduit 21.

Secured to the side wall 6 of the coolant tank and mounted adjacent one end thereof is a bracket arm 30 (Figure 3) having its lower end as at 31 welded or otherwise secured in place, and said bracket arm 30 has its free end secured to an angle bracket 32 which forms a support for an electric motor 33. The electric motor is held in place by suitable machine screws or the like as at 34. The armature shaft of the motor 33 as at 35 is disposed obliquely and has affixed or keyed thereto a sprocket wheel or the like as at 36 (Figure 4). Mounted within the tubular conveyor passageway formed by the conveyor tubes 19, 20, 21, 26 and 28 is an endless sprocket chain composed of a series of chain links 37 having one end formed with a bar portion 38 and the opposite end provided with a hooked portion 39 for receiving said bar portion 38 so that the space between the chain links 37 will provide a sprocket tooth receiving opening of a slightly larger size than the teeth on the sprocket wheel 36. Alternate chain links 37 are provided with laterally-extending arm portions 40 (Figures 6 and 7) which arm portions may be formed integral with the chain links or may be attached thereto in any suitable manner.

Secured to the laterally extending arm portions 40 of the chain links 37 is a series of conveyor flights generally indicated by the reference character 41. Each conveyor flight 41 is formed of a pair of pressed metal stampings 42 which are adapted to be secured together and to the laterally extending wing portions 40 by rivets or the like 43 being passed through suitable openings 44 in the laterally extending wing portions 40 which are aligned with openings 45 in the pressed-metal stampings 42. The peripheral edge of each stamping 42 is flanged as at 46 to provide a space therebetween for receiving a natural or synthetic rubber insert 47 which is adapted to withstand considerable wear during the handling of abrasive material or particles deposited in the cooling liquid. In forming the flight members, it has been found that rubber scrapers composed of Buna-N, Thiokol or neoprene synthetic types are preferable since they offer high resistance to petroleums, oils and abrasions. Each of the conveyor flights 41 is cut away as at 48 to form a recess or passageway for permitting the travel of said flights over the sprocket wheel 36 during their passage thereabout.

Mounted on the free ends of the conveyor conduits 24 and 28 and spaced from the flared portions 25 and 29 thereof is a guard plate 49 (Figures 3 and 5) to prevent the material being discharged along with the sludge from passing downwardly along the outer surface of said flared portions 25 and 29. A guard housing 50 is secured to the bracket arm 30 to conceal the sprocket 36 and conveyor flights as they traverse said sprocket so as to prevent material adhering thereto from being thrown by centrifugal action on objects adjacent the coolant tank. It is to be noted that the intermediate portion of the conveyor tube 21 is supported by an angle bracket 51 secured in place to the side wall 6 of the coolant tank as by means of welding or the like, and, if desired, the conveyor tube 21 may be anchored by welding at the point of contact to said angle bracket and thereby form a rigid structure. When it is desired to adjust the tension of the endless conveyor, or when the sprocket chain 37 becomes worn, the adjusting nuts 52 may be manipulated so as to permit movement of the angle bracket 32 and motor 33 to a new position of adjustment for taking up said wear or slack in the conveyor chain.

Coolant liquid from the machine tool is fed to the coolant tank adjacent one end thereof on one side of a vertical partition wall 53 (Figure 2) which extends between the side walls 6 and 7 and has its ends connected thereto by welding or the like and its lowermost end angularly bent as at 54 to form a small shelf or supporting foot. The partition wall 53 thus provides a deposit or collection chamber 55 having a sloping bottom wall 16 which converges toward the partition wall 53 and terminates a short distance therefrom so as to form a restricted passageway between the collection chamber 55 and the coolant tank including the dropped bottom portion having the converging bottom walls 11.

Figure 2:
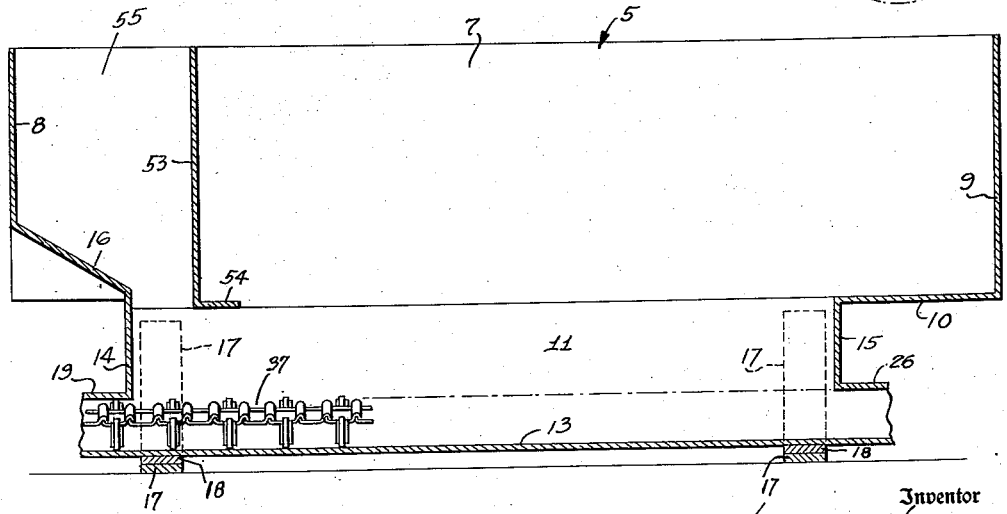
Figure 2 is a longitudinal section taken on the line 2—2 in Figure 1 showing a portion of the flight conveyor traversing the bottom of the tank.

A collection receptacle 56 is disposed beneath the free ends of the conveyor conduits for collecting the sludge discharged from the coolant tank by the endless conveyor during the operation thereof. The endless conveyor may operate in either direction of rotation, but as shown in Figure 5, the conveyor conduit 28 is shown as forming the discharge passageway so that sludge S may be carried upwardly therein and discharged from the flared end 29 of said conduit whereby said sludge will fall into the collection receptacle 56. The liquid level L of the coolant liquid is indicated in Figure 5, which permits the use of a large quantity of coolant liquid with better settling and separation characteristics so as to completely remove all foreign particles from the coolant liquid before the same is returned to the machine tool upon which the liquid is used. The openings 48 in the conveyor flights 41 permit the liquid or coolant material to drain back as shown in Figure 5 and remove the sludge S above the liquid level while said cooling liquid is draining therefrom. When the sludge finally reaches the top or discharge opening 29, the major portion of the liquid contents has been removed therefrom so as to prevent the waste of said coolant liquid and eliminate the necessity of replenishing the contents of the tank periodically. It will be understood that the tank shown in Figures 1, 2 and 3 is ordinarily provided with a circulating and filtering system. The latter is omitted here because it forms no part of the present invention. It is shown, however, in my previously-mentioned copending application, Serial No. 558,424, filed October 12, 1944, of which this is a division.

In operation, when it is desired to circulate coolant liquid to and from a machine tool and separate foreign matter from said coolant liquid, the coolant tank shown in Figures 1 to 7 inclusive is placed adjacent the machine tool with its collection chamber 55 disposed beneath the discharge of the machine tool so that the coolant liquid therefrom will drain into said coolant tank. After the coolant tank has thus been disposed adjacent the machine tool as above described, the motor 33 is started to cause the endless conveyor to travel at a relatively slow rate of speed so as to continuously move sludge and sediment collected along the bottom of the coolant tank or along the conveyor path as at 13. With the endless conveyor in operation, the circulating and filtering system is also placed in operation.

In the modified form of the invention shown in Figures 8 and 9, the coolant tank is slightly different in construction as well as the arrangement of the sludge removal conveyor. As shown in Figures 8 and 9, the coolant tank generally indicated by the reference character 90 comprises a pair of side walls 91 connected at one of their ends by an end wall 92. A pair of sloping bottom walls 93 connect the side walls 91 for a portion of their length and said sloping walls converge on a central trough 94 for receiving and facilitating the collection of sludge and sediment settling in the bottom of the tank. The sloping bottom walls 93 are bent at their point of convergence as at 95 to form sloping bottom walls arranged on an incline which converge in an inclined trough 96. The inclined sloping walls have their edges welded or otherwise secured to the side walls 91 of the tank as indicated in Figure 9.

Mounted within the coolant tank 90 is a conveyor conduit of tubular construction having a portion as at 97 extending parallel with the trough 94 and the remaining portion thereof inclined as at 98 and extending parallel to the trough formed by the point of convergence of the inclined sloping bottom walls 96. The relatively spaced and horizontal conveyor conduit portion 97 extends through an opening in the end wall 92 of the coolant tank 90 and is welded or otherwise secured thereto to prevent the escape of liquid therebetween, and the end of said relatively horizontal conduit portion 97 projects externally of the coolant tank and is provided with a return bent portion 99 which has its end as at 100 received in an opening in the end wall 92 directly below the opening through which the relatively straight tubular conduit portion 97 projects. The end 100 of the return bent section 99 may be welded or otherwise affixed in place so as to register with the trough 94 of the converging sloping bottom walls 93. The upper end of the inclined tubular conduit portion 98 is provided with a flared mouth portion 101 and secured thereto by means of welding or the like is a supporting plate 102 which is also affixed to the projecting upper end portion 103 of the trough 96 formed by the inclined converging sloping bottom walls.

A motor supporting bracket 104 is adjustably secured to the coolant tank 90 for supporting an electric motor 105 which has its base adjustably secured to the supporting plate 104 by means of a slot and bolt connection 106. The armature shaft 107 of the motor 105 is provided with a sprocket wheel 108 over which is trained an endless sprocket chain 109 similar to the sprocket chain 37 described in connection with the form of the invention shown in Figures 1 to 7. Conveyor flights 110 are mounted on the endless conveyor chain in identically the same manner as pointed out and described in Figures 1 to 5, 13 and 14, and said flights 110 are constructed of opposed flight discs having interposed therebetween rubber wear members 111. Each of the conveyor flights 110 is cut away in the same manner as described in connection with the conveyor flight 41 shown in Figures 1 to 7 and indicated by the reference character 48 therein.

It will thus be seen that the endless conveyor, including the endless sprocket chain 109 and spaced conveyor flights 110 will be guided through the conveyor conduit sections 97 and 98 as well as the return bent portion 99. In order to cause the lower course of said endless conveyor to travel in conformity to the troughs 94 and 96 formed by the sloping bottom walls of the coolant tank, a guide plate 112 has its upper edge welded as at 113 to the under side of the tubular conveyor conduit section 97 so as to depend therefrom, with the lower end provided with a guide strip 114 for being received in the cutaway portion of the conveyor flights 110 so as to engage the endless conveyor chain 109 and thereby hold the flights in position during their travel along the trough 94 formed by the inclined sloping bottom walls 93.

The guide strip 112 is provided with an angular portion 115 which is inclined upwardly and is welded to the bottom portion of the inclined conveyor tube section 98, and said inclined portion is provided with a flanged lower edge surface 116 continuous with the flanged portion 114 so as to guide the conveyor flight 110 during their travel along the inclined trough 96 formed by the inclined sloping bottom walls of the coolant tank. The upper end 117 of the inclined portion of the guide strip 115 is welded to the supporting plate 102, as well as being welded to the upper projecting end portion of the inclined section 98 of the conveyor tube conduit.

A collection chamber 118 is mounted between the side walls 91 of the coolant tank 90 to extend beneath the discharge portion 103 of the inclined trough 96, and said receptacle has its side walls inclined to permit the same to be positioned well within or between the side walls 91 of the coolant tank and conform to the sloping trough 96 of the converging inclined bottom walls of said tank. It will thus be seen that the coolant tank 90 may be placed under the discharge of the machine tool so as to collect the cooling liquid therefrom so that the same will be received in said tank and the heavier foreign particles therein will settle to the trough 94 and be carried or moved to the endless conveyor flights 111.

The operation of the form of the invention shown in Figures 8 and 9 is substantially the same as pointed out in connection with the showing in Figures 1 to 7, and said coolant tank 90 may also be provided with a circulating and filtering system of the type shown in my previously-mentioned co-pending application, Serial No. 558,424, filed October 12, 1944.

It is to be noted that the collection tank and conveyor systems above disclosed and described can be used advantageously for handling dry material of a pulverant nature such as lamp black, fly ash, sugar, starches and siliceous material. The offset or decentered positions of the flights on the conveyor chain also gives the flight conveyor the great advantage of being able to turn sharp bends in the conveyor conduit or trough without jamming. The ordinary conveyor with the chain running through the center of the flights tends to jam when incompressible materials are being conveyed since the flights have to tilt relatively to one another in traversing the bend. When the flights tilt in the center, as in prior conveyors, this necessitates the compression of the material on the inside of the bend. Where the flights are connected to the chain near their edges, as in the present flight conveyor (Figs. 6 and 7), the necessity for compression is greatly reduced when the chain is caused to traverse the inner side of the bend.

What I claim is:

1. A flight conveyor comprising an approximately U-shaped conveyor conduit structure arranged substantially in a vertical plane and including upper and lower portions and an arcuate connecting portion extending between said upper and lower portions, said upper and connecting portions including a bent pipe, and said lower portion having an elongated trough-shaped bottom and an elongated top spaced above said bottom with elongated openings therebetween for the reception of descending material to be conveyed, an endless conveyor chain mounted in said conduit structure, said chain having a multiplicity of links pivotally connected end to end, a series of approximately circular conveyor flights mounted in spaced relationship on said links at locations spaced away from the centers of said flights, a drive sprocket meshing with and drivingly engaging said chain, and a motor drivingly connected to said driving member, certain of said links having laterally projecting wing extensions thereon comprising ears on opposite sides thereof extending outwardly therefrom in opposite directions from said links and said flights being secured to said extensions.

2. A flight conveyor comprising an approximately U-shaped conveyor conduit structure arranged substantially in a vertical plane and including upper and lower portions and an arcuate connecting portion extending between said upper and lower portions, said upper and connecting portions including a bent pipe, and said lower portion having an elongated trough-shaped bottom and an elongated top spaced above said bottom with elongated openings therebetween for the reception of descending material to be conveyed, an endless conveyor chain mounted in said conduit structure, said chain having a multiplicity of links pivotally connected end to end, a series of approximately circular conveyor flights mounted in spaced relationship on said links at locations spaced away from the centers of said flights, a drive sprocket meshing with and drivingly engaging said chain, and a motor drivingly connected to said driving member, each of said flights including at least one reinforcing disc and an arcuate elastic deformable wear member secured to the margin of said disc and projecting beyond the periphery thereof.

HENRY W. HAPMAN.

REFERENCES CITED

The following references are of record in the file of this patent:

UNITED STATES PATENTS

| Number | Name | Date |
|---|---|---|
| 258,722 | Dodge | May 30, 1882 |
| 1,023,981 | Ashworth | Apr. 23, 1912 |
| 1,637,869 | Manzel | Aug. 2, 1927 |
| 2,235,991 | Hapman | Mar. 25, 1941 |
| 2,476,040 | Hapman | July 12, 1949 |